(12) United States Patent
Williams et al.

(10) Patent No.: US 8,542,480 B2
(45) Date of Patent: Sep. 24, 2013

(54) STAND TO SUPPORT AN ELEMENT OF A COMPUTING SYSTEM

(75) Inventors: Don Williams, Campbell, CA (US); David N Skinner, Redwood Shores, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 213 days.

(21) Appl. No.: 13/193,732

(22) Filed: Jul. 29, 2011

(65) Prior Publication Data
US 2013/0027866 A1 Jan. 31, 2013

(51) Int. Cl.
*G06F 1/16* (2006.01)

(52) U.S. Cl.
USPC ............. 361/679.22; 248/288.11; 312/118; 211/126.26

(58) Field of Classification Search
USPC ............. 211/168, 132.1, 170, 104, 126.26; 312/223.2, 279, 118; 345/156, 168, 173, 345/174; 248/121.1, 277.1, 125.7, 423, 288.11; 361/679.22, 679.01, 679.27, 679.55, 679.41, 361/679.06, 679, 21, 679.02
See application file for complete search history.

(56) References Cited

U.S. PATENT DOCUMENTS

| | | | |
|---|---|---|---|
| 4,880,327 A * | 11/1989 | Sanabria | 402/73 |
| 5,732,928 A | 3/1998 | Chang | |
| 6,189,594 B1 * | 2/2001 | Carter | 160/135 |
| 6,305,652 B1 | 10/2001 | Borke et al. | |
| 7,352,565 B2 | 4/2008 | Yin | |
| 7,841,567 B2 | 11/2010 | Wang | |
| 2006/0108483 A1 * | 5/2006 | Wolff et al. | 248/122.1 |
| 2008/0251680 A1 | 10/2008 | Matias | |

FOREIGN PATENT DOCUMENTS
CN 201281204 7/2009

OTHER PUBLICATIONS

19" LCD Monitors Roundup. Part XI. p. 9, X-bit Labs, http://www.xbitlabs.com/articles/monitors/display/19inch-11 9.html, 3 pages.
Apple, iPad Smart Cover, http://www.apple.com/ipad/smart-cover/, Jul. 6, 2011, 4 pages.
Samsung SyncMaster 172T LCD, http://www.modfactor.com/reviews/monitors/Samsun172T/Samsung172t.hrml, 7 pages.

* cited by examiner

*Primary Examiner* — Huang Duong

(57) ABSTRACT

A stand for a computing system includes a first panel, a second panel, and a third panel. The first panel, second panel, and third panel may be pivoted to provide support in a low-angle orientation, a high-angle orientation, and a flat orientation.

15 Claims, 8 Drawing Sheets

800

Slide a first panel of the stand to pivot a second panel and a third panel of the stand between a lower retracted position associated with a flat orientation of the stand and a lower extended position associated with a high-angle orientation of the stand — 810

Slide the third panel to pivot the second panel and the first panel between an upper retracted position associated with the flat orientation of the stand and an upper extended position associated with a low-angle orientation of the stand — 820

*FIG. 8*

STAND TO SUPPORT AN ELEMENT OF A COMPUTING SYSTEM

BACKGROUND

Display stands may be complicated and bulky, unsuitable for tablet or all-in-one (AiO) form-factors for computing systems. Adjustable stands may be difficult to adjust into positions associated with viewing tablets or AiOs, and may riot enable changes between display orientations.

BRIEF DESCRIPTION OF THE DRAWINGS/FIGURES

FIG. 8 is a flow chart based on a method of adjusting a stand to support an element of a computing system according to an example.

The present examples will now be described With reference to the accompanying drawings. In the drawings, like reference numbers may indicate identical or functionally similar elements.

DETAILED DESCRIPTION

Example stands may enable a computing system to be supported in multiple orientations, such as substantially flat or at several different reclined/vertical angles. Stands may enable a computing system to be supported in a user's lap. Stands may provide a vertical (high-angle) orientation for content viewing and keyboard/mouse interaction, reclined (low-angle) for touch interaction, and horizontal (flat) for collaborative interactions. Stands may be thin and light, integrated into a computing system and easy to use with an intuitive interface for transitioning among different support orientations by sliding panels of the stand. Slidable panels may be slidable upward, downward, or flat with respect to the computing system, enabling various orientations to support the computing system/display. The stand is light, thin, and unobtrusive such that it may be integrated into the computing system without a need to carry it separately, without disturbing the portability of the computing system. Examples provide tool-free adjustability, attachment, and removal of stands.

Figure 1:
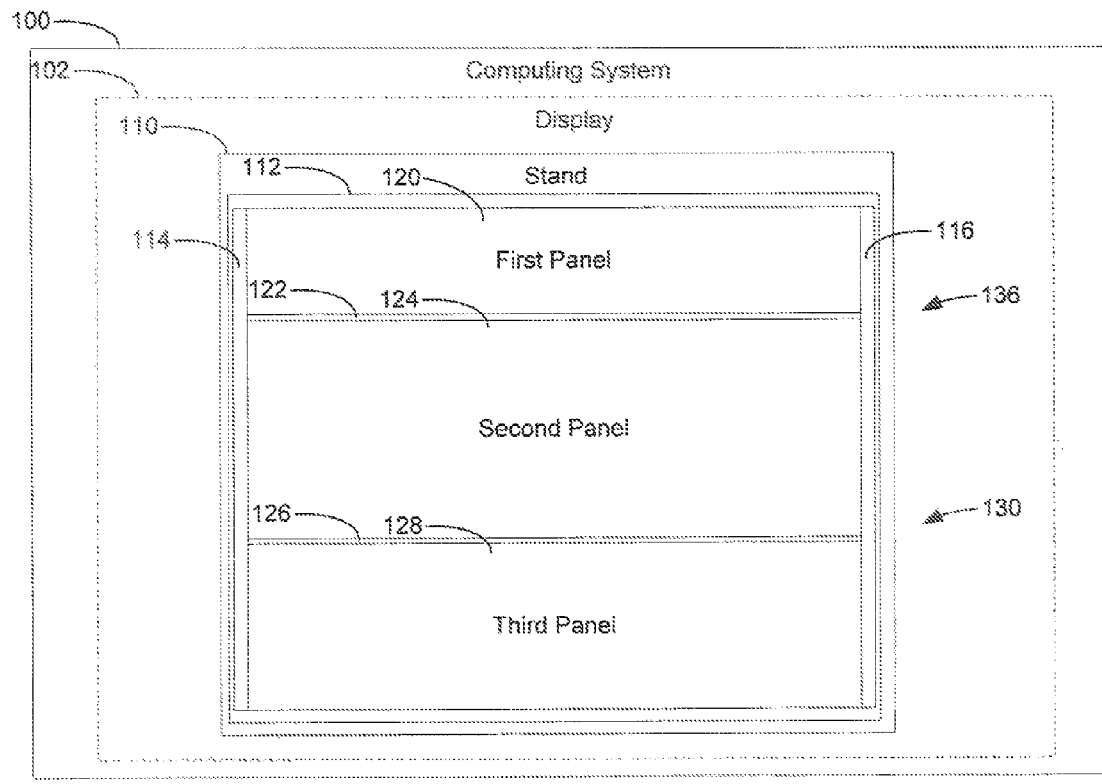
FIG. 1 is a rear view of a stand of a computing system according to an example.

FIG. 1 is a rear view of a stand 110 of a computing system 100 according to an example. Computing system 100 may include a display 102. The stand 110 may include a base 112 and a first panel 120, a second panel 124, and a third panel 128. The first panel 120, second panel 124, and third panel 128 may be planar forms including joining areas for coupling to each other and to the computing system 100, and may be constructed of plastic, metal, composites, or other materials, including materials used to construct computing system 100. Joining areas may include through-holes for accommodating pins to form joints between panels, and joining areas may include protrusions for pivotally and slidably interacting with the-computing system 100. The panels may include venting holes or other accommodations in view of the computing system 100.

The first panel 120 may be pivotally coupled to the second panel 124 via a first joint 122. The second panel 124 may be pivotally coupled to the third panel 128 via a second joint 126. The base 112 may include a first rail 114 and a second fail 116. The first panel 120, second panel 124, and third panel 128 may be slidably mounted to the first rail 114 and the second rail 116.

The computing system 100 may be a tablet or other hand held computing system including a processing module and display 102. Computing system 100 may also be a desktop computing system or other system such as an All-in-One (AiO) that includes a processing module and display 102. Stand 110 may be removable from computing system 100, and stand 110 may be adapted to mount to various displays 102 and computing systems 100. Display 102 is shown in a landscape orientation, but may be supported by stand 110 in other orientations including portrait orientation.

First panel 120, second panel 124, and third panel 128 are shown in a flat, orientation, substantially parallel to stand 110. First panel 120 and second panel 124 are positioned in an upper retracted position 136, and second panel 124 and third panel 128 are positioned in a lower retracted position 130. Thus, stand 110 may support display 102 in a substantially flat position. For example, computing system 100 may be placed flat on a table, simultaneously viewable by several users positioned around the table.

First panel 120, second panel 124, and third panel 128 may include cutouts, hollows, lattice structures, or other cavities. In alternate examples, first panel 120, second panel 124, and third panel 128 may include cavities occupying substantially the entire panels, such that the panels are provided as wireframes. Panels may also include friction pads and/or handles to facilitate actuation by a user, as well as to provide friction with respect to a surface upon which the stand is placed. Panels may also include interfaces and/or cutouts adapted to couple with docking stations or other components.

Figure 2:
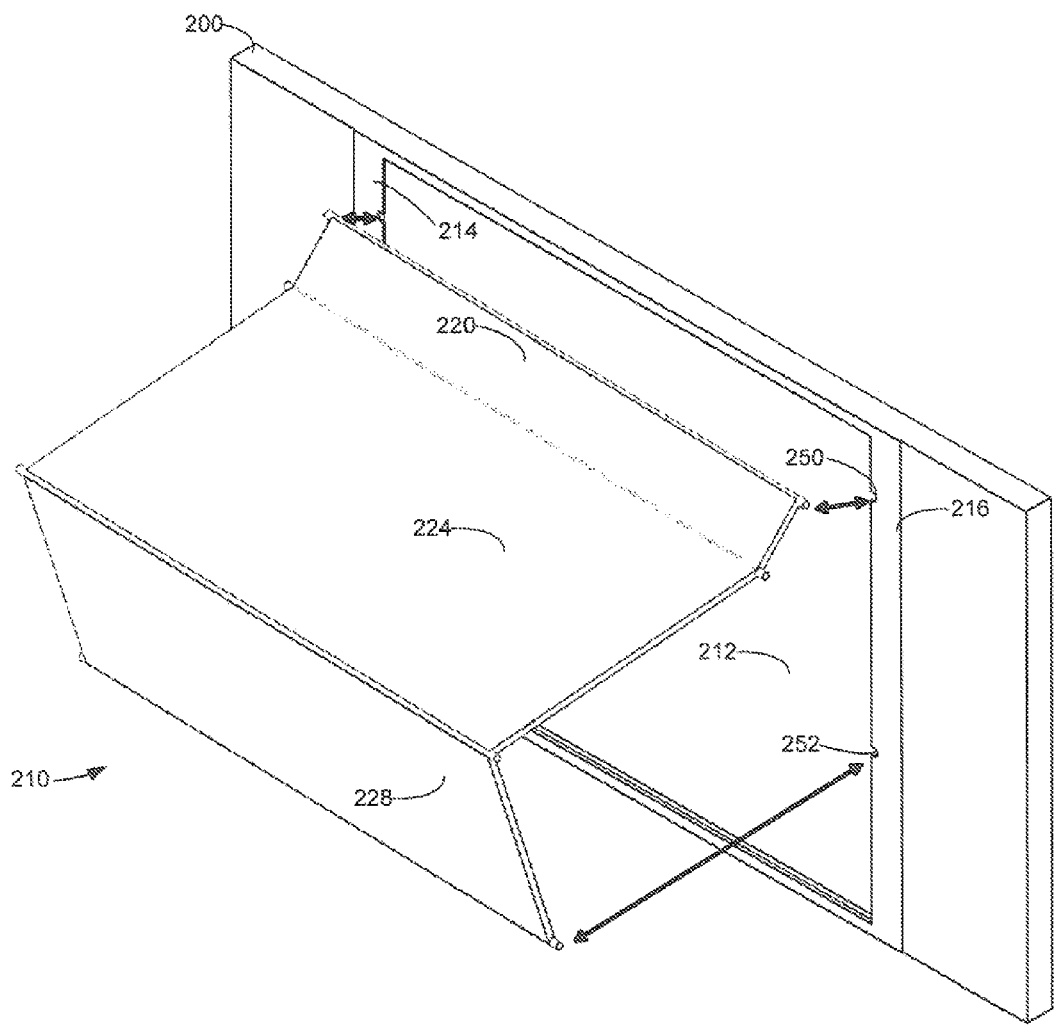
FIG. 2 is a perspective view of a stand of a computing system according to an example.

FIG. 2 is a perspective view of a stand 210 of a computing system 200 according to an example. First panel 220, second panel/224, and third panel 228 are shown removed from base 212, first rail 214, and second rail 216. Pins are shown extending from sides of first panel 220, second panel 224, and third panel 228. In alternate examples, pins may be omitted. For example, pins may be omitted from the second panel 224 such that the upper edge of first panel 220 and the lower edge of third panel 228 include pins. As indicated by the arrows, pins associated with the first panel 220 and second panel 224 are removable via the upper slots 250, and pins associated with the third panel 228 and second panel 224 are removable via the lower slots 252. In alternate examples, pins may be removable via any slots, including a slot disposed in a top or bottom surface of the base 212 (not shown).

Removable panels enable access to base 212, and enable a weight savings for computing system 200. In an example, the panels may be removed to expose a Video Electronics Standards Association (VESA) Mounting interface Standard (MIS) or Flat Display Mounting Interface (FDMI) associated with base 212, for using a separate monitor stand with computing system 200. Removable panels further enable easy and efficient replacement of panels/joints in the event of damage. Panels may be removed for servicing the computing system 200 and/or upgrading components/ports of the computing system 200.

Figure 3:
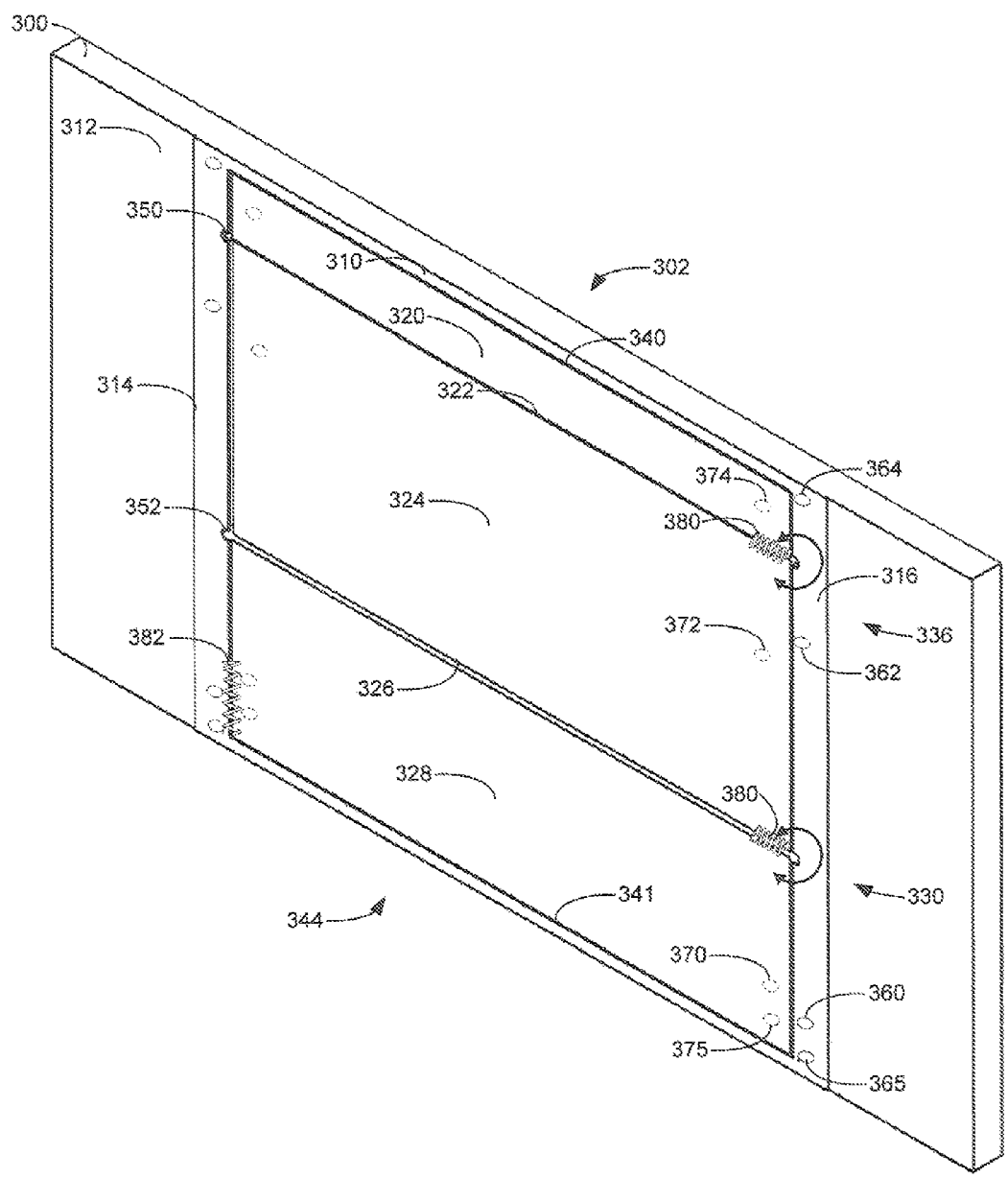
FIG. 3 is a perspective view of a stand of a computing system according to an example.

FIG. 3 is a perspective view of a stand 310 of a computing system 300 according to an example. Computing system 300 may include a display 302 (not visible) facing away from stand 310. Stand 310 may include base 312, first rail 314, second rail 316, first panel 320, second panel 324, and third panel 328. The first panel 320, second panel 324, and third panel 328 are positioned to allow the stand 310 to support the display 302 in a flat orientation 344. First panel 320 may be pivotally coupled to second panel 324 at first joint 322, and second panel 324 may be pivotally coupled to third panel 328 at second joint 326.

First panel 320, second panel 324, and/or third panel 328 may include slidable mounts to interact with first rail-314 and second rail 316. For example, first joint 322 and/or second joint 326 may be pin joints, including pins that extend into first rail 314 and second rail 316 to slidably mount first joint 322 and second joint 326. First panel 320 may include a first pin joint 340 mounted to the rails, and third panel 328 may include a second pin joint 341 mounted to the rails. Additional mounting mechanisms may be used to provide a slidable relationship between first rail 314, second rail 316, and the first panel 320, second panel 324, and third panel 328.

First rail 314 and second rail 316 may include slots to allow removal of panels from the rails. For example, upper slots 350 and lower slots 352 may be positioned in first rail 314 and second rail 316 corresponding to a position of the first joint 322 and second joint 326. Thus, when first joint 322 and/or second joint 326 are pivoted away from the stand 312, pins may be removed from the first rail 314 and the second rail 316.

First joint 322 and second joint 326 are shown in a substantially flat orientation, such that first panel 320 and second panel 324 are in an upper retracted position 336, and second panel 324 and third panel 328 are in a lower retracted position 330. First joint 322 and second joint 326 may be biased toward a substantially flat orientation. For example, torsion springs 380 may provide a bias to first joint 322 and second joint 326, enabling the panels to remain substantially flat. Magnets may also be used to bias the first joint 322 and the second joint 326. For example, magnets may be used in the first rail 314 and second rail 316, as well as in the panels and/or the base 312, to provide a biasing force causing first joint 322, second joint 326, first panel 320, second panel 324, and third panel 328 to remain substantially flat.

Arrays of magnets associated with north-south alignments, and multipole magnets, may be used to provide variations in attracting/repelling panels and/or joints. For example, a magnetic array may be used in the base 312 corresponding to second magnets 372, to repel magnets in second panel 324 and attract magnets in first panel 320. Other combinations of magnets are possible, including electromagnets to selectively attract/repel the panels and/or joints. Three north-south alignments of magnets may be associated with three orientations of the stand 310. Thus, magnets may help push and/or follow-through a motion initiated by a user, finish off the movement and stabilize the panels at a desired position/orientation. Mechanical alternatives, such as springs/detents, may provide similar functionality.

First panel 320, second panel 324, and third panel 328 may assume any slidable position with respect to first rail 314 and second rail 316. Resistance of movement along the slidable positions may be varied. For example, magnets may be used to repel intermediate positions and encourage movement toward discrete slidable positions-associated with various orientations. Friction may be varied along a slidable path of the first rail 314 and the second rail 316. Discrete slidable positions may be provided using detents, magnets, brother mechanisms associated with the rails, panels, and/or base.

Sliding a panel upward or downward with respect to the first rail 314 and second rail 316 may cause a panel (including the sliding panel) to pivot due to interactions with the pivotable arrangement of the panels and slidable arrangement with respect to the rails. Affecting the slidability of a panel may therefore affect pivotable arrangements of the panels. As an example, sliding one panel may cause the remaining two panels to pivot, and preventing the sliding panel from moving may retain the pivoted panels in their pivoted position.

Accordingly, for example, first spring clip detents 360 may be associated with first rail 314 and second rail 316 to affect the slidable position of second pin joint 341 of third panel 328 when slid upward. Third panel 328 may be slidable upward to position first panel 320 and second panel 324 in a substantially non-parallel orientation with respect to the base 312 and/or each other. Similarly, second spring clip detents 362 may affect the slidable position of first pin joint 340 of first panel 320 when slid downward. First panel 320 may be slidable downward to position second panel 324 and third panel 328 in a substantially non-parallel orientation with respect to the base 312 and/or each other. Third spring clip detents 364, 365 may affect the slidable position of the first panel 320 and the second panel 328, for example securing the panels in a substantially parallel/flat position.

First magnets 370, second magnets 372, and third magnets 374, 375 similarly may affect positioning of the panels and/or joints. The magnets may be positioned in the first panel 320, the second panel 324, the third panel 328, and/or in the base 312. Accordingly, first magnets 370 may be associated with a slidable position of third panel 328 to orient the first panel 320 and the second panel 324. Second magnets 372 may be associated with a slidable position of first panel 320 to orient the second panel 324 and the third panel 328. Third magnets 374, 375 may be associated with positioning the panels substantially flat/parallel with respect to the base 312 and/pr each other.

The panels and/or joints may be biased toward or away from various positions using springs, magnets, and/or other mechanisms/combinations. For example, linear spring 382 may be arranged to provide a linear bias to second pin joint 341, and may be arranged in other locations/orientations. Magnets may provide linear bias, including combinations of magnetic polarity arrangements to repel and/or attract the panels and/or joints. A releasable lock may be included to secure the position of a panel and/or joint. Any of the detents and/or magnets may be associated with a lock to selectively prevent movement of a panel and/or joint. Actuators may be used to actuate movement of the panels and/or joints, such as linear actuators associated with the rails and/or rotatable actuators associated with the joints and/or pins.

Examples of stand 310 enable intuitive operation to provide a low-angle orientation, high-angle orientation, and flat orientation in response to sliding the panels. The upper slots 350 and the lower slots 352 may be positioned to allow the first joint 322 and the second joint 326 to pivot outward from the stand 310. For example, sliding the first panel 320 downward may pivot second joint 326 outward from the lower slots 352 without displacing the first joint 322 from the base, and sliding the third panel 328 upward may pivot first joint 322 outward without displacing the second joint 326 from the base. Thus, joints/pins may be constrained selectively, including constraining sliding, pivoting, or translating. Any of the panels may be slidable, and panels and/or joints may include areas and/or handles to facilitate operation of the panels. In the flat orientation 344 shown in FIG. 3, pins/pin joints associated with the panels may be constrained within the slidable path of the first rail 314 and the second rail 316, and pins/pin joints associated with first joint 322 and second joint 326 may be disengagable via upper slots 350 and lower slots 352.

Figure 4:
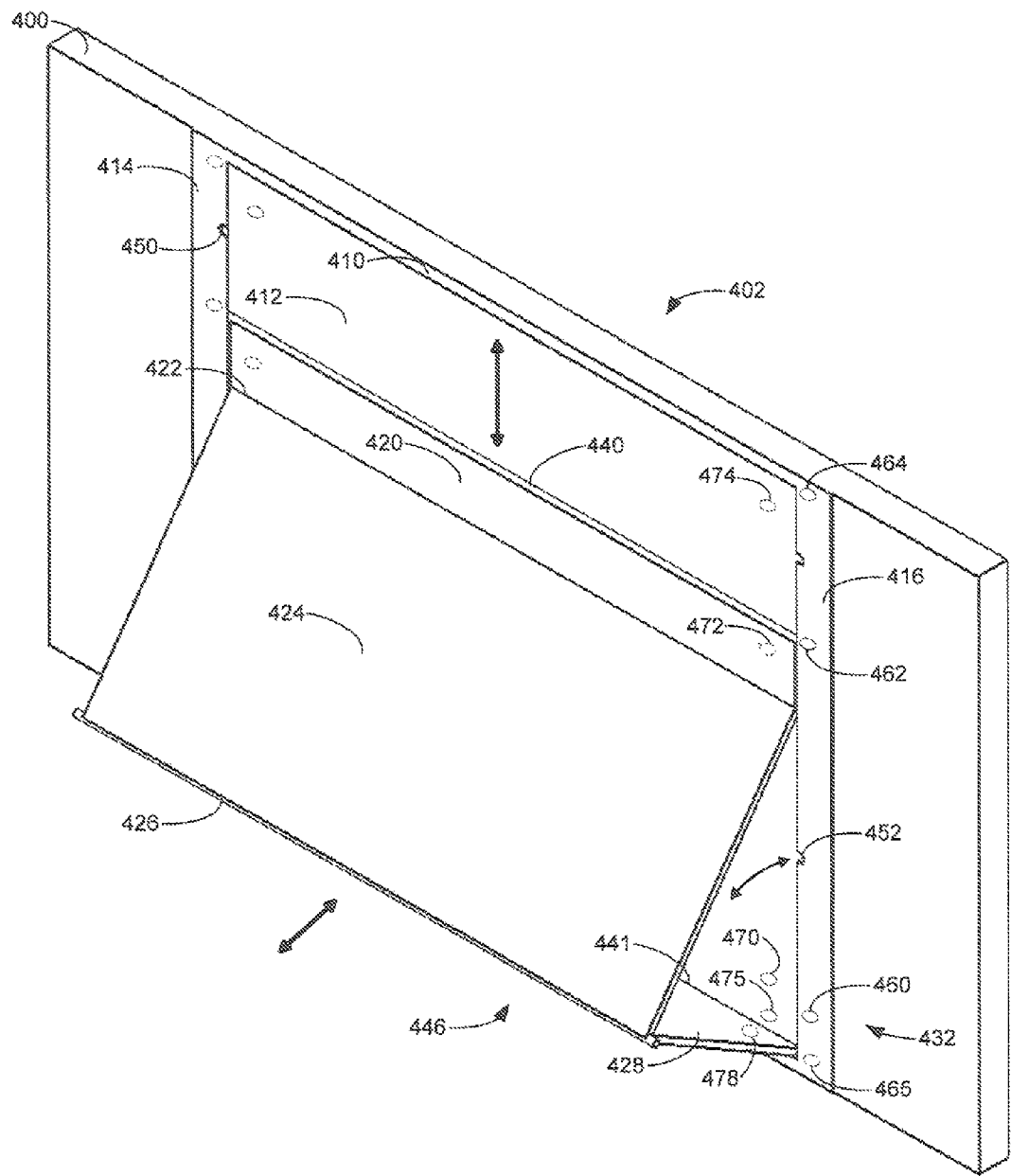
FIG. 4 is a perspective view of a stand of a computing system according to an example.

FIG. 4 is a perspective view of a stand 410 of a computing system 400 according to an example. First panel 420, second panel 424, and third panel 428 are positioned to allow the stand 410 to support the display 402 (not visible) in a high-angle orientation 446.

First panel 420 is slidable downward, to pivot first joint 422 and second joint 426 such that second panel 424 and third panel 428 assume a lower extended position 432. When sliding, first joint 422 may bypass upper slots 450 located in first rail 414 and second rail 416. For example, a sliding force applied to first panel 420 may stabilize pins extending from first panel 420 within the rails to prevent the pins from passing through the upper slots 450. First panel 420 may include a friction area or handle to identify a position for applying force to slide the first panel 420.

In contrast to bypassing upper slots 450, second joint 426 has passed through lower slots 452 and disengaged from first rail 414 and second rail 416. Disengaging from the rails allows the second panel 424 and third panel 428 to pivot into substantially non-parallel positions to support the stand 410. First pin joint 440 associated with the first panel 420 and second pin joint 441 associated with the third panel 428 may remain engaged with the first rail 414 and the second rail 416.

First panel 420 may remain substantially parallel to base 412 when slid downward to disengage upper third spring clip detents 464 and upper third magnets 474. Second spring clip detents 462 and/or second magnets 472 may secure the first panel 420 in the illustrated position, and a lock may be used. Panel magnets may be used in the first panel 420 corresponding to the second magnets 472 that may be positioned in the base 412.

Third panel 428 is pivoted at an angle with respect to the stand 410. The angle may be chosen in view of the size, weight, and other characteristics of the stand 410 and/or computing system 400, as well as desired viewing angles for display 402. Lower third spring clip detents 465 are engaged with second pin joint 441 of third panel 428. First spring clip detents 460, first magnets 476, lower third magnets 475, and third panel magnets 478 are disengaged.

Figure 5:
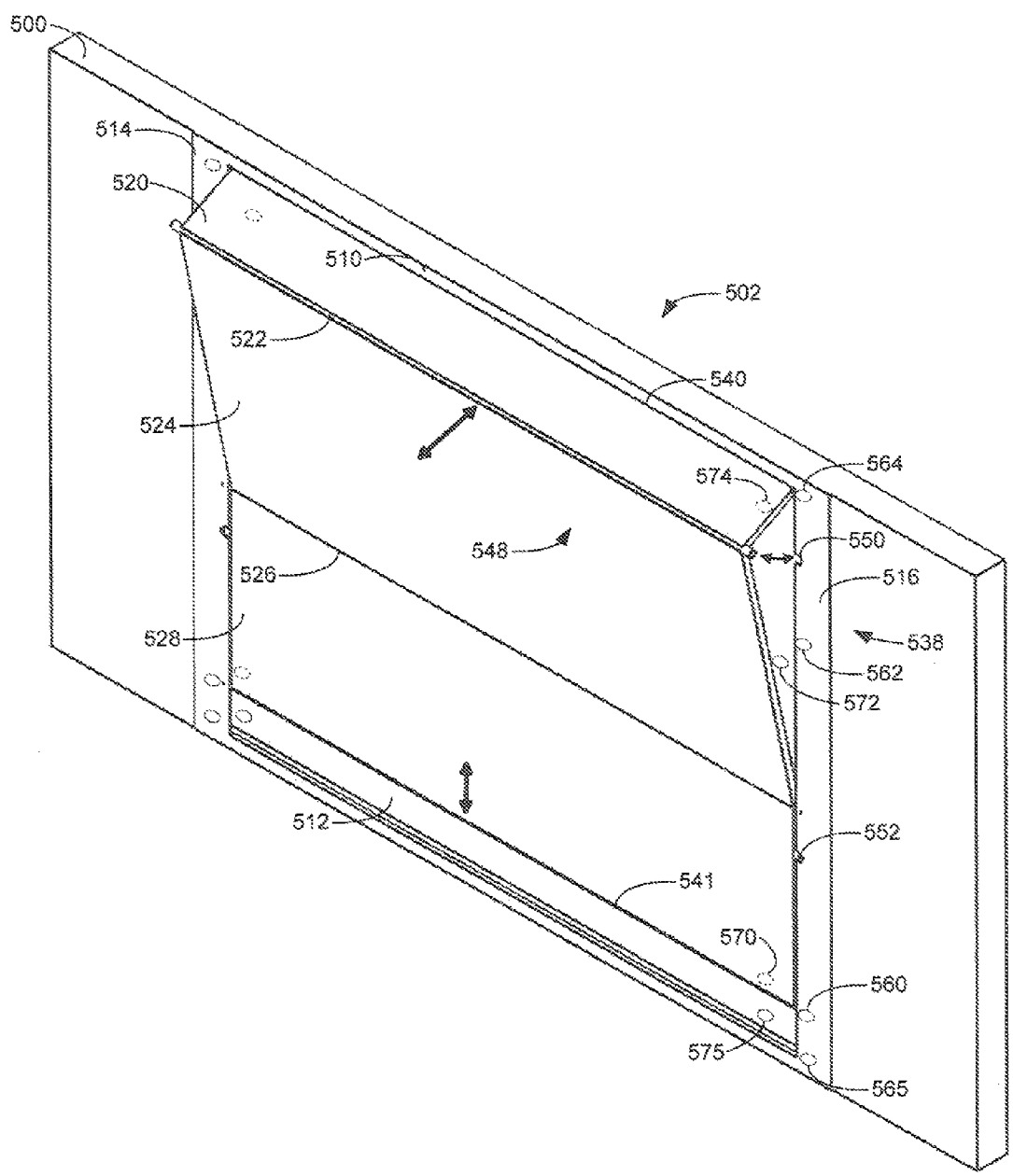
FIG. 5 is a perspective view of a stand of a computing system according to an example.

FIG. 5 is a perspective view of a stand 510 of a computing system 500 according to an example. First panel 520, second panel 524, and third panel 528 are positioned to allow the stand 510 to support the display 502 (not visible) in a low-angle orientation 548.

Third panel 528 is slidable upward, to pivot first joint 522 and second joint 526 such that first panel 520 and second panel 524 assume an upper extended position 538. When sliding, second joint 526 may bypass lower slots 552 located in first rail 514 and second rail 516. For example, a sliding force/applied to third panel 528 may stabilize pins extending from third panel 528 within the rails to prevent them from passing through the lower slots 552. Third panel 528 may include a friction area or handle to identify a position for applying force to slide the third panel 528.

First joint 522 has passed through upper slots 550 and disengaged from the rails, allowing the first panel 520 and second panel 524 to pivot into substantially non-parallel positions to support the stand 510. First pin joint 540 associated with the first panel 520 and second pin joint 541 associated with the third panel 528 remain engaged with the first rail 514 and the second rail 516.

Third panel 528 may remain substantially parallel to base 512 when slid upward to disengage lower third spring clip detents 565 and lower third magnets 575. First spring clip detents 560 and/or first magnets 570 may secure the third panel 528 in the illustrated position, and a lock may be used. Panel magnets may be used in the third panel 528 corresponding to the first magnets 570, which may be located in the base 512.

First panel 520 and second panel 524 are pivoted at an angle with respect to the stand 510. The angle may be chosen in view of the size, weight, and other characteristics of the stand 510 and/or computing system 500, as well as desired viewing angles for display 502. Upper third spring clip detents 564 are engaged with first pin joint 540 of first panel 520. Lower third spring clip detents 565, lower third magnets 575, second magnets 572, second spring clip detents 562, and upper third magnets 574 are disengaged.

Figure 6:
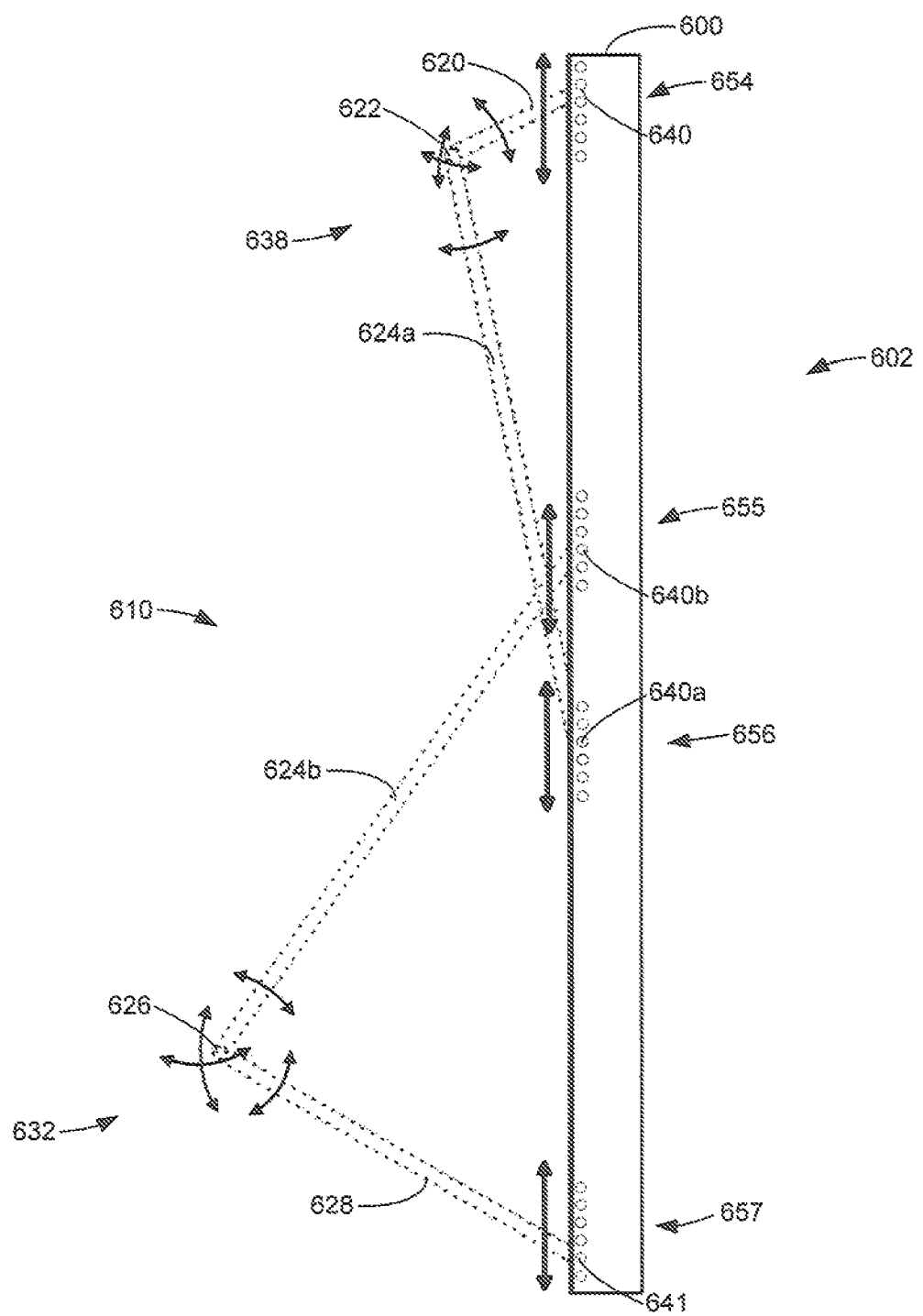
FIG. 6 is a side view of a stand of a computing system according to an example.

FIG. 6 is a side view of a stand 610 of a computing system 600 according to an example. Various incremental panel positions/display orientations may be used to orient the display 602. A first pin joint 640 of first panel 620 may be positioned based on first panel upper positions 654. A first middle pin joint 640a, associated with second panel 624a in upper extended positions 638, may be positioned based on second panel lower positions 656. A second middle pin joint 640b, associated with second panel 624b in lower extended positions 632, may be positioned based on second panel upper positions 655. A second pin joint 641 of third panel 628 may be positioned based on third panel lower positions 657.

Angles and positions of first joint 622 and second joint 626 may be varied to accommodate incremental viewing angles of display 602. Lengths, widths, heights, and other dimensions may be varied of stand 610, first panel 620, second panel 624a, 624b, and third panel 628. Positions 654, 655, 656, and 657 may be provided based on spring clip detents, magnets, and/or other combinations and mechanisms.

Figure 7:
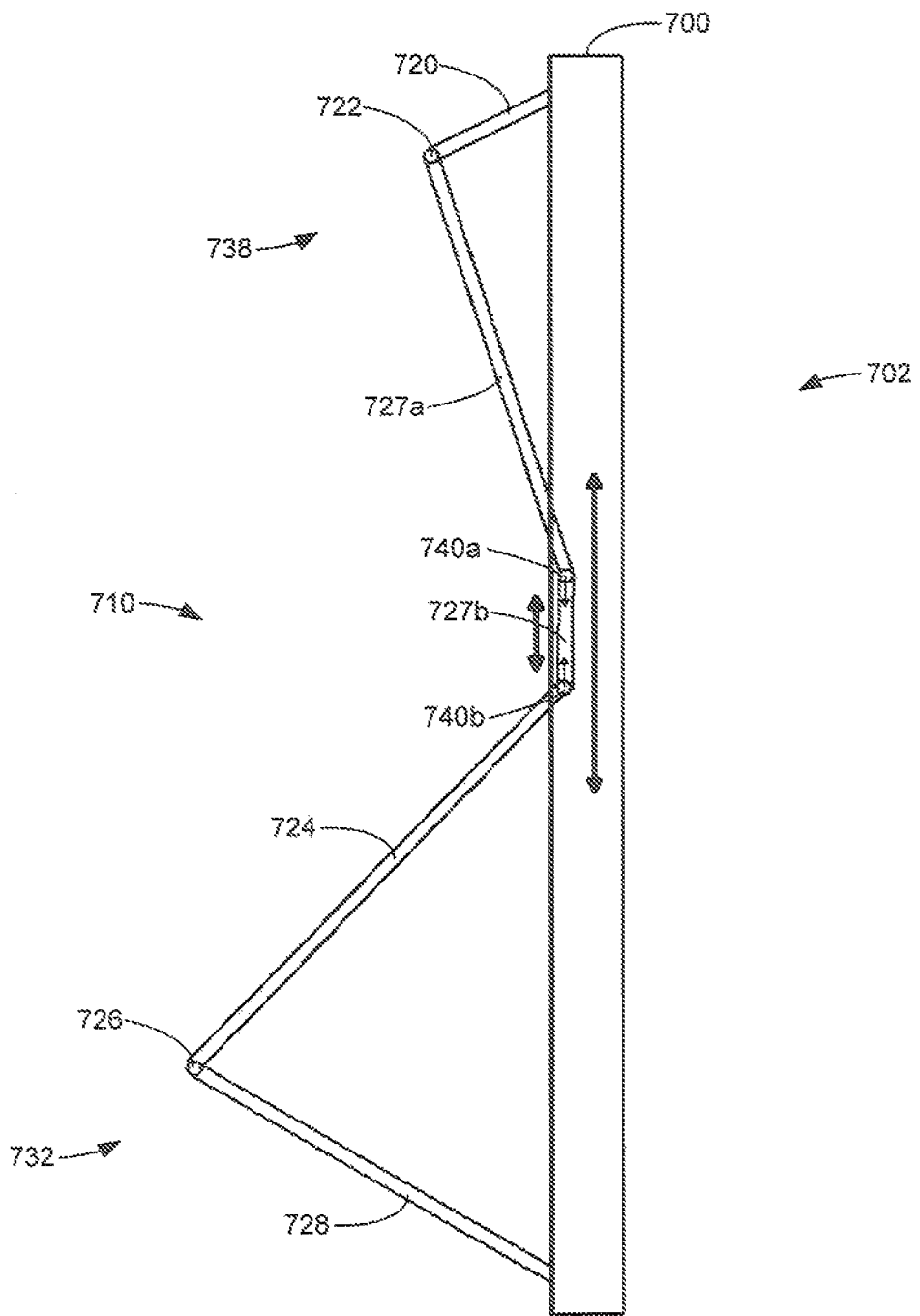
FIG. 7 is a side view of a stand of a computing system according to an example.

FIG. 7 is a side view of a stand 710 of a computing system 700 according to an example. Stand 710 includes a first additional panel 727a and a second additional panel 727b. In alternate examples, a greater or lesser number of additional panels may be incorporated with first panel 720, second panel 724, and third panel 728. First and second middle pin joints 740a, 740b may be used to join the first additional panel 727a and the second additional panel 727b to other panels and/or the stand 710.

The first additional panel 727a and the second additional panel 727b may provide functionality with respect to the pivoting and positioning of first joint 722 and second joint 726. For example, upper extended position 738 and/or lower extended position 732 may be affected by sliding second additional panel 727b upward or downward. Panels may include a friction area and/or a handle, such as a handle on second additional panel 727b. Second additional panel 727b may allow first and second middle pin joints 740a, 740b to slide toward each other within second additional panel 727b. Upper extended position 738 and lower extended position 732 may be used simultaneously to support display 702.

FIG. 8 is a flow chart 800 based on a method of adjusting a stand to support an element of a computing system according to an example, in step 810, a first panel of the stand is slid to pivot a second panel and a third panel of the stand between a lower retracted position associated with a flat orientation of the stand and a lower extended position associated with a high-angle orientation of the stand. In step 820, the third panel is slid to pivot the second panel and the first panel between an upper retracted position associated with the flat orientation of the stand and an upper extended position associated with a low-angle orientation of the stand.

The breadth and scope of the present invention should not be limited by any of the above-described examples, but should be defined in accordance with the following claims and their equivalents.

What is claimed is:

1. A computing system, comprising:
   a display element that has a rigid surface; and
   a stand to support the display element, including a base coupled to the rigid surface, a first panel pivotally mounted to the base, a second panel pivotally mounted to the first panel, and a third panel pivotally mounted to the second panel and the base, wherein the first panel, second panel and third panel are each movable relative to the base and the rigid surface, to support the display element in at least one orientation.

2. The computing system of claim 1, wherein the third panel is slidable to pivot the first panel and the second panel between positions associated with a flat orientation and a low-angle orientation; and the first panel is slidable to pivot the second panel and third panel between positions associated with the flat orientation and a high-angle orientation.

3. The computing system of claim 1, wherein at least one of the first panel, the second panel, and the third panel is lockable in at least one of a high-angle orientation, a low-angle orientation, and a flat orientation.

4. The computing system of claim 1, wherein at least one of the first panel, the second panel, and the third panel is removable from the base.

5. The computing system of claim 1, wherein the stand further includes at least one additional panel, such that the third panel is mounted to the second panel via the at least one additional panel.

6. A stand to support an element of a computing system, comprising:
   a first rail and a second rail mounted to a base;
   a first panel slidably mounted to the first rail and the second rail;
   a second panel slidably mounted to the first rail and the second rail and pivotally connected to the first panel at a first joint; and
   a third panel slidably mounted to the first rail and the second rail and pivotally connected to the second panel at a second joint.

7. The stand of claim 6, further comprising pin joints to slidably mount the first panel, the second panel, and the third panel to the first rail and the second rail.

8. The stand of claim 7, further comprising spring clip detents to position at least one of the pin joints, wherein first spring clip detents are associated with a low-angle orientation, second spring clip detents are associated with a high-angle orientation, and third spring clip detents are associated with a flat orientation.

9. The stand of claim 7, further comprising slots disposed in the first rail and the second rail to disengage the pin joints.

10. The stand of claim 6, further comprising magnets to position at least one of the first panel, the second panel, the third panel, the first joint, and the second joint; wherein first magnets are associated with a low-angle orientation, second magnets are associated with a high-angle orientation, and third magnets are associated with a flat orientation.

11. A method of adjusting a stand to support an element of a computing system, the element having a rigid surface, the method comprising:
   sliding a first panel of the stand relative to a base of the stand that is coupled to the rigid surface to pivot a second panel and a third panel of the stand between a lower retracted position associated with a flat orientation of the stand relative to the n surface and a lower extended position associated with a high-angle orientation of the stand; and
   sliding the third panel relative to the base to pivot the second panel and the first panel between an upper retracted position associated with the flat orientation of the stand and an upper extended position associated with a low-angle orientation of the stand.

12. The method of claim 11, wherein the lower extended position includes a plurality of lower extended sub-positions associated with incremental high-angle orientations of the stand; and the upper extended position includes a plurality of upper extended sub-positions associated with incremental low-angle orientations of the stand.

13. The method of claim 11, further comprising biasing at least one of the first panel, the second panel, and the third panel toward a position associated with at least one of the high-angle orientation, the low-angle orientation and the flat orientation of the stand.

14. The method of claim 13, wherein biasing is based on a torsion spring associated with at least one pivotable joint associated with the panels.

15. The method of claim 13, wherein biasing is based on a magnet.

* * * * *

UNITED STATES PATENT AND TRADEMARK OFFICE
CERTIFICATE OF CORRECTION

PATENT NO. : 8,542,480 B2  
APPLICATION NO. : 13/193732  
DATED : September 24, 2013  
INVENTOR(S) : Don Williams et al.

Page 1 of 1

It is certified that error appears in the above-identified patent and that said Letters Patent is hereby corrected as shown below:

In the Claims

In column 8, line 23, in Claim 11, delete "the n" and insert -- the --, therefor.

In column 8, line 40, in Claim 13, delete "orientation" and insert -- orientation, --, therefor.

Signed and Sealed this  
Third Day of December, 2013

Margaret A. Focarino  
*Commissioner for Patents of the United States Patent and Trademark Office*